(12) United States Patent
Amirparviz

(10) Patent No.: US 8,503,087 B1
(45) Date of Patent: Aug. 6, 2013

(54) STRUCTURED OPTICAL SURFACE

(75) Inventor: Babak Amirparviz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 234 days.

(21) Appl. No.: 12/917,754

(22) Filed: Nov. 2, 2010

(51) Int. Cl.
G02B 27/14 (2006.01)
(52) U.S. Cl.
USPC .......................... 359/630; 359/850
(58) Field of Classification Search
USPC ................. 359/237, 245, 246, 290, 291, 298, 359/618, 619, 630, 850–852
See application file for complete search history.

(56) References Cited

U.S. PATENT DOCUMENTS

| | | |
|---|---|---|
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |

(Continued)

FOREIGN PATENT DOCUMENTS

| | | |
|---|---|---|
| GB | 2272980 A | 6/1994 |
| WO | WO96/05533 A1 | 2/1996 |
| WO | WO 99/46619 A | 9/1999 |

OTHER PUBLICATIONS

Mukawa, Hiroshi et al., "8.4: Distinguished Paper: A Full Color Eyewear Display using Holographic Planar Waveguides", SID Symposium Digest of Technical Papers, May 2008, pp. 89-92, vol. 39, Issue 1.

(Continued)

*Primary Examiner* — Scott J Sugarman
*Assistant Examiner* — Vipin Patel
(74) *Attorney, Agent, or Firm* — Blakely Sokoloff Taylor & Zafman LLP

(57) ABSTRACT

An optical structure includes an array of mirrors disposed on a substrate. The mirrors are disposed over a surface of the substrate and oriented at a plurality of different oblique angles relative to the surface of the substrate. The substrate comprises a clear substrate to pass external light through interstitial gaps between the mirror structures such that the optical structure is partially transparent and partially reflective. The optical structure may optionally be illuminated with an image source that emits substantially a single light ray per pixel of the image source to provide an optical system.

18 Claims, 9 Drawing Sheets

U.S. PATENT DOCUMENTS

| | | | |
|---|---|---|---|
| 6,724,354 B1 | 4/2004 | Spitzer et al. | |
| 6,738,535 B2 | 5/2004 | Kanevsky et al. | |
| 6,747,611 B1 | 6/2004 | Budd et al. | |
| 6,829,095 B2 | 12/2004 | Amitai | |
| 6,879,443 B2 | 4/2005 | Spitzer et al. | |
| 6,952,306 B1 * | 10/2005 | Anderson | 359/298 |
| 7,021,777 B2 | 4/2006 | Amitai | |
| 7,116,402 B2 * | 10/2006 | Gui | 355/57 |
| 7,158,096 B1 | 1/2007 | Spitzer | |
| 7,161,729 B2 * | 1/2007 | Kim et al. | 359/291 |
| 7,242,527 B2 | 7/2007 | Spitzer et al. | |
| 7,346,260 B2 | 3/2008 | Arakida et al. | |
| 7,391,573 B2 | 6/2008 | Amitai | |
| 7,457,040 B2 | 11/2008 | Amitai | |
| 7,576,916 B2 | 8/2009 | Amitai | |
| 7,577,326 B2 | 8/2009 | Amitai | |
| 7,643,214 B2 | 1/2010 | Amitai | |
| 7,663,805 B2 | 2/2010 | Zaloum et al. | |
| 7,672,055 B2 | 3/2010 | Amitai | |
| 7,724,441 B2 | 5/2010 | Amitai | |
| 7,724,442 B2 | 5/2010 | Amitai | |
| 7,724,443 B2 | 5/2010 | Amitai | |
| 7,751,122 B2 | 7/2010 | Amitai | |
| 7,843,403 B2 | 11/2010 | Spitzer | |
| 7,876,489 B2 | 1/2011 | Gandhi et al. | |
| 7,900,068 B2 | 3/2011 | Weststrate et al. | |
| 8,004,765 B2 | 8/2011 | Amitai | |
| 2001/0021058 A1 | 9/2001 | McClelland et al. | |
| 2001/0022682 A1 | 9/2001 | McClelland et al. | |
| 2003/0090439 A1 | 5/2003 | Spitzer et al. | |
| 2005/0174651 A1 | 8/2005 | Spitzer et al. | |
| 2006/0192306 A1 | 8/2006 | Giller et al. | |
| 2006/0192307 A1 | 8/2006 | Giller et al. | |
| 2007/0047091 A1 | 3/2007 | Spitzer et al. | |
| 2007/0103388 A1 | 5/2007 | Spitzer | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 | 8/2008 | Amitai | |
| 2008/0219025 A1 | 9/2008 | Spitzer et al. | |
| 2008/0247722 A1 | 10/2008 | Van Gorkom et al. | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitari | |
| 2009/0161383 A1 | 6/2009 | Meir et al. | |
| 2009/0237804 A1 | 9/2009 | Amitai et al. | |
| 2009/0262324 A1 * | 10/2009 | Patra et al. | 355/68 |
| 2009/0290244 A1 * | 11/2009 | Cho et al. | 359/849 |
| 2010/0046070 A1 | 2/2010 | Mukawa | |
| 2010/0046219 A1 | 2/2010 | Pijlman et al. | |
| 2010/0103078 A1 | 4/2010 | Mukawa et al. | |
| 2010/0149073 A1 | 6/2010 | Chaum et al. | |
| 2010/0171680 A1 | 7/2010 | Lapidot et al. | |
| 2010/0203235 A1 * | 8/2010 | Verschuuren et al. | 427/66 |
| 2010/0278480 A1 | 11/2010 | Vasylyev | |
| 2011/0213664 A1 | 9/2011 | Osterhout et al. | |

OTHER PUBLICATIONS

Levola, Tapani, "Diffractive Optics for Virtual Reality Displays", Academic Dissertation, University of Joensuu, Department of Physics, Vaisala Laboratory, 2005, 26 pages.

Cakmakci, Ozan et al., "Head-Worn Displays: A Review", Journal of Display Technology, Sep. 2006, 20 pages, vol. 2, Issue 3.

* cited by examiner

US 8,503,087 B1

STRUCTURED OPTICAL SURFACE

TECHNICAL FIELD

This disclosure relates generally to the field of optics, and in particular but not exclusively, relates to near-to-eye optical systems.

BACKGROUND INFORMATION

A head mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD is often referred to as augmented reality because the viewer's image of the world is augmented with an overlaying CGI, also referred to as a heads-up display ("HUD").

HMDs have numerous practical and leisure applications. Aerospace applications permit a pilot to see vital flight control information without taking their eyes off the flight path. Public safety applications include tactical displays of maps and thermal imaging. Other application fields include video games, transportation, and telecommunications. Due to the infancy of this technology, there is certain to be new found practical and leisure applications as the technology evolves; however, many of these applications are currently limited due to the cost, size, field of view, and efficiency of conventional optical systems used to implemented existing HMDs.

FIG. 1A illustrates a conventional near-to-eye optical system 101 using an input lens and two mirrors. Near-to-eye optical system 101 may be used to implement a HMD. An image source 105 outputs an image that is reflected by two conventional flat mirror surfaces 110 and 115, which form an image near to eye 120. Image source 105 is typically mounted above the head or to the side of the head, while mirror surfaces 110 and 115 bend the image around the front of the viewer's face to his eye 120. Since the human eye is typically incapable of focusing on objects placed within a few centimeters, this system requires a lens 125 interposed between the first mirror surface 110 and image source 105. Lens 125 creates a virtual image that is displaced further back from the eye than the actual location of mirror surface 115 by positioning image source 105 inside of the focal point f of lens 125. Optical system 101 suffers from a small field of view (e.g., approximately 20 degrees) limited by the extent of mirror surfaces 110 and 115 and the bulkiness of lens 125.

FIG. 1B illustrates operation of a conventional flat mirror surface 130. As can be seen, each ray (e.g., rays R1, R2, R3) of divergent light emanating from source point S1 is reflected off of mirror surface 130 with a different angle. Although rays R1, R2, and R3 all originate from a common source point S1, each ray is reflected with a different trajectory and ends up at a different destination point D1, D2, and D3. In other words, the reflective properties of mirror surface 130 result in a one-to-one correspondence between divergent rays R1, R2, and R3 from a common source point S1 and destination points D1, D2, D3. Mirror surface 130 cannot reflect two or more divergent rays from common source point S1 to a single destination point. Rather, with flat mirror surface 130 the angles of incidence and departure for each ray are identical and mirrored along the normal vector extending from the surface.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus, system, and method for fabrication of a structured optical surface are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2A:
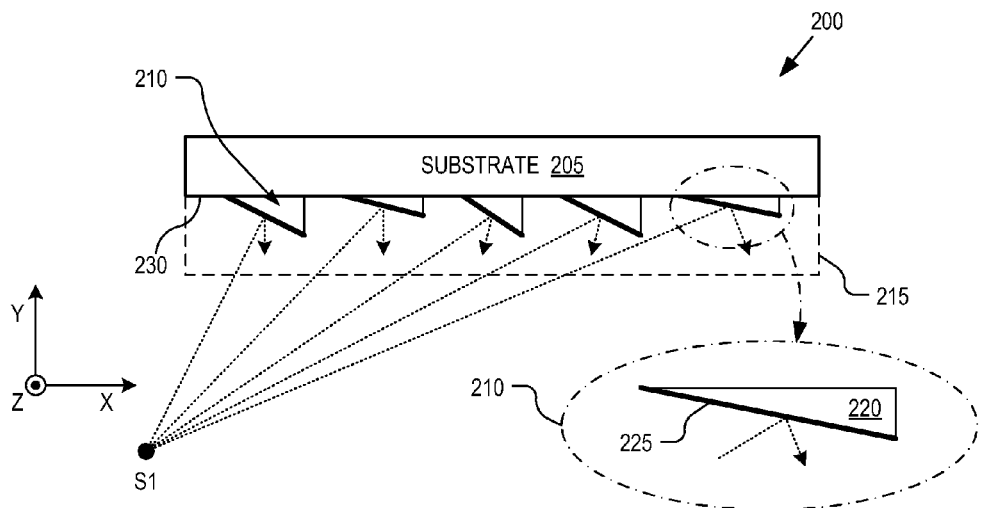
FIG. 2A is a top view illustrating a structured optical surface, in accordance with an embodiment of the invention.
Figure 2B:
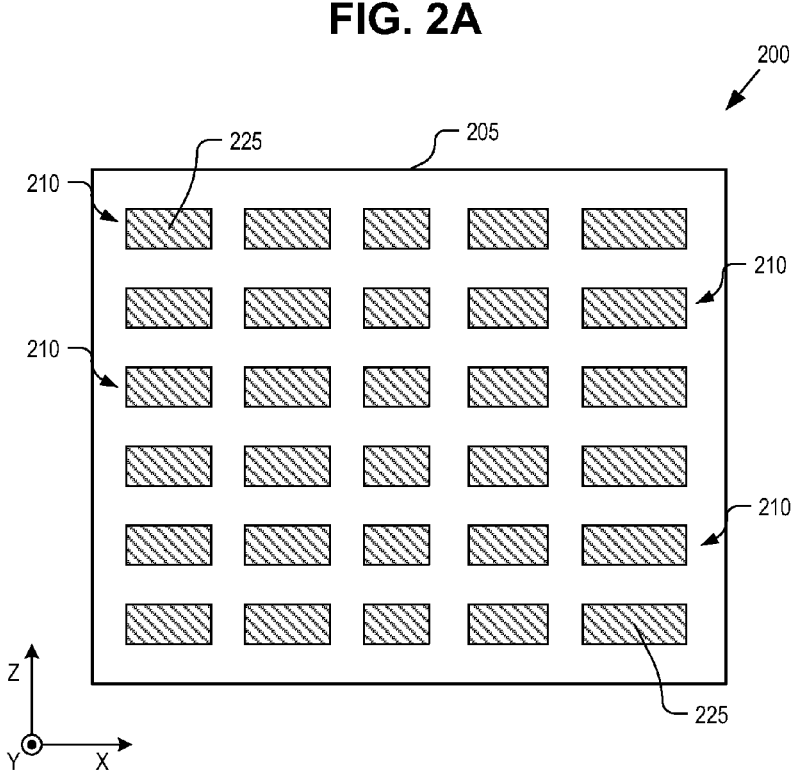
FIG. 2B is a front view illustrating the same structured optical surface, in accordance with an embodiment of the invention.

FIGS. 2A and 2B illustrate a structured optical surface 200, in accordance with an embodiment of the invention. FIG. 2A is a top view of structured optical surface 200 while FIG. 2B is a front view of the same. The illustrated embodiment includes a substrate 205, an array of mirror structures 210, and an optional protective layer 215. The illustrated embodiment of each mirror structure 210 includes a tilt element 220 and a reflective surface 225.

In the illustrated embodiment, mirror structures 210 are disposed over surface 230 of substrate 205 in a grid pattern. However, the layout of mirror structures 210 can be customized to suit the needs of a particular application and need not be organized into columns and rows. The interstitial gaps between mirror structures 210 can be consistent or variable. Similarly, the size and shape of each reflective surface 225 within the array can be uniform or variable. Although FIG. 2B illustrates each reflective surface 225 as being rectangular in shape, other embodiments may include square, circular, oval, or other shapes for reflective surfaces 225. In one embodiment, reflective surfaces 225 are flat, planar reflective surfaces. In one embodiment, surface 230 of substrate 206 is a flat, planar surface. In alternative embodiments, substrate 205 may be molded or flexibly bent to achieve a curved surface 230.

The mirror structures 210 are configured to tilt or angle reflective surfaces 225 obliquely relative to surface 230 of substrate 205. Different mirror structures 210 may be configured with different oblique angles. In some embodiments, tilt structure 220 may obliquely angle its reflective surface 225 in two axes of rotation relative to surface 230. By independently configuring the tilt angle(s), size, and position of each mirror structure 210 over the array of mirror structures 210, structured optical surface 200 can independently direct rays of light incident over its front side in selectable directions. If the incident light is divergent light originating from a source point S1, structure optical surface 200 can direct the divergent light to one or more destination points (e.g., see FIGS. 3A-C). Structured optical surface 200 can be used to reflect an image back to an eye and expand or widen the field of view when perceiving the image (e.g., see FIG. 4). The tilt angles of mirror structure 210 may further be adjusted over the array in a non-linear manner to achieve a desired effect. For example, the tilt angles may be configured to increase image acuity within solid angles extending out from perception points (e.g., see FIG. 6). These and other embodiments are discussed in further detail below.

In one embodiment, reflective surfaces 225 are fabricated of reflective but non-transmissive material, such as metal (e.g., aluminum, tin, gold, etc.), while substrate 205 is fabricated of an optically transmissive material, such clear polymer, quartz, glass, silicon, or otherwise. In another embodiment, reflective surfaces 225 are fabricated of a multi-layer dielectric structure including dielectric reflective layers. This multi-layer dielectric structure can be tuned, based on the number, type, and thickness of the constituent layers, to have a specific wavelength reflection response or a specific angular reflection response. In one embodiment, the wavelength reflection response and/or the angular reflection response can be modified on a per mirror structure 210 basis and need not be uniform across the array.

In an embodiment, where substrate 205 is clear, external light can pass through substrate 205 between the interstitial gaps between adjacent mirror structures 210. This configuration results in a partially transparent (semi-transparent) and partially reflective structured optical surface 200 that can be used to implement an augmented reality in a near-to-eye display. Mirror structures 210 can be used to reflect a computer generated image ("CGI") superimposed over a real world image passing through the interstitial gaps. In other embodiments, substrate 205 need not be optically transmissive; rather structured optical surface 200 may be used simply to reflect an image in a controllable manner to provide a fully virtual near-to-eye display.

Figure 2C:
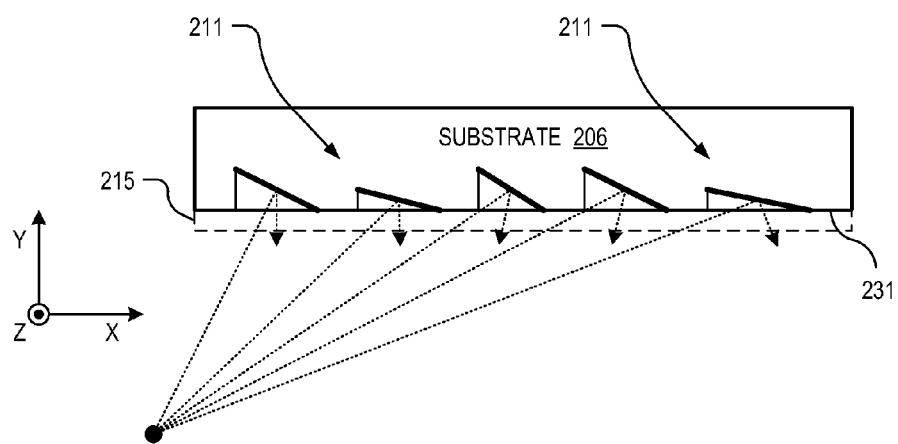
FIG. 2C is a top view illustrating a structured optical surface with recessed mirror structures, in accordance with an embodiment of the invention.

FIG. 2A illustrates mirror structures 210 as raised mirror structures that rise above surface 230 of substrate 205. In an alternative embodiment (see FIG. 2C), the mirror structures may be implemented as recessed mirror structures 211 recessed into surface 231 of substrate 206. A recessed mirror structure may be less susceptible to damage, but may provide a more limited field of view depending upon material choices for substrate 206. In either embodiment, protective layer 215 may be disposed over the array of mirror structures for protection and to planarize the surface. In one embodiment, protective layer 215 includes a clear polymer material and may further include an anti-reflective coating.

Structured optical surface 200 may be fabricated using a variety of techniques. For example, tilt elements 220 upon which reflective surfaces 225 are disposed may be formed of photoresist material and the sloped surfaces achieved using grey scale lithography. Reflective surfaces 225 may be fabricated by depositing metal and using liftoff procedures to form the selective metal patterns.

Figure 3A:
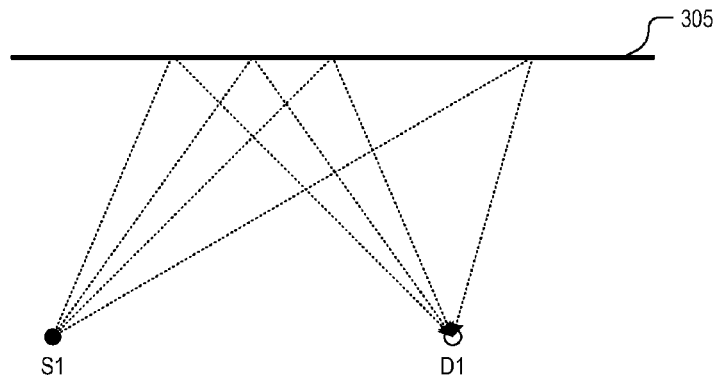
FIG. 3A is a simplified diagram of a structured optical surface having an array of mirror structures configured to provide point-to-point reflections of divergent light rays, in accordance with an embodiment of the invention.
Figure 3B:
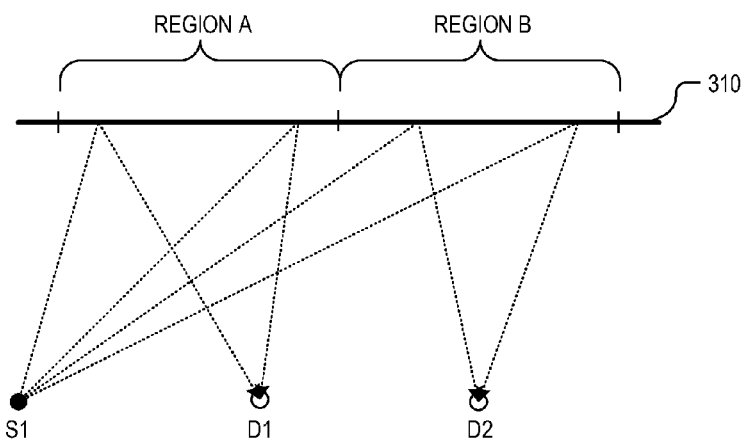
FIG. 3B is a simplified diagram of a structured optical surface having an array of mirror structures configured to provide point-to-multipoint reflections of divergent light rays divided along multiple contiguous regions, in accordance with an embodiment of the invention.
Figure 3C:
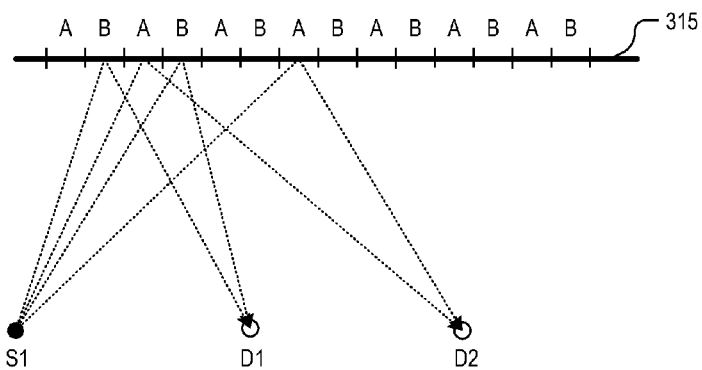
FIG. 3C is a simplified diagram of a structured optical surface having an array of mirror structures configured to provide point-to-multipoint reflections of divergent light rays divided along multiple interleaved regions, in accordance with an embodiment of the invention.

FIGS. 3A-C illustrate how applying different configurations of tilt angles to reflective surfaces 225 can achieve different reflective applications for structured optical surface 200. FIG. 3A is a simplified diagram of a structured optical surface 305 having an array of mirror structures configured to provide point-to-point reflections of divergent light rays, in accordance with an embodiment of the invention. Structured optical surface 305 represents one possible configuration of structured optical surface 200.

Figure 1A:
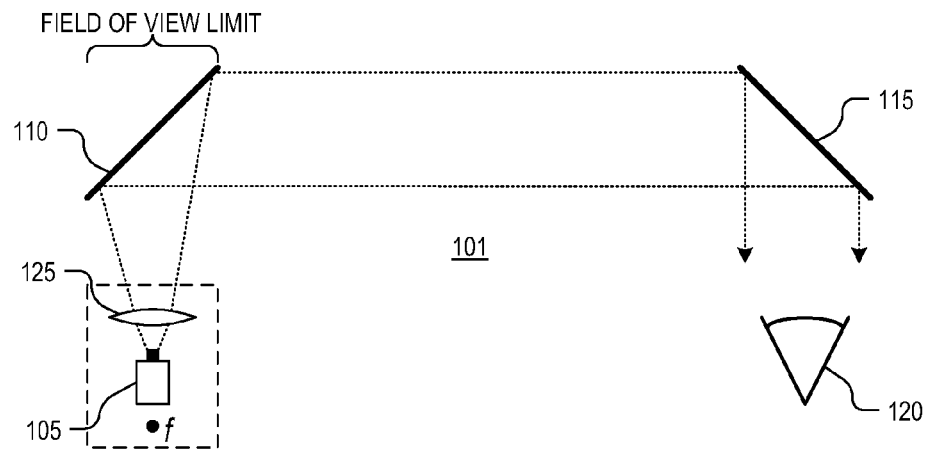
FIG. 1A (PRIOR ART) illustrates a conventional near-to-eye optical system using an input lens and two mirrors.
Figure 1B:
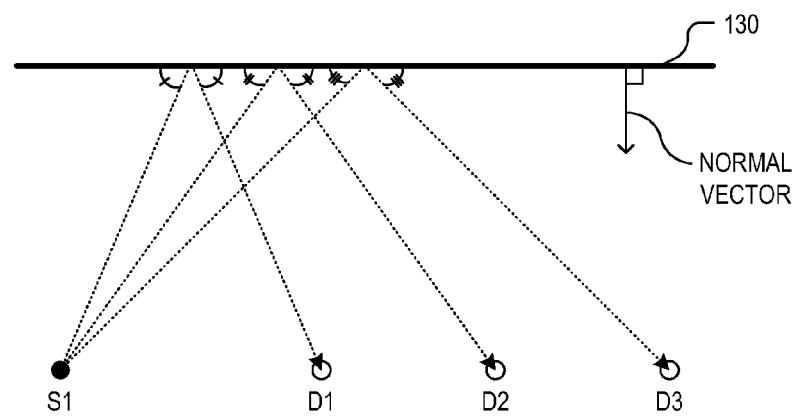
FIG. 1B (PRIOR ART) illustrates operation of a conventional flat mirror surface.

In the point-to-point embodiment of FIG. 3A, the mirror structures are individually angled to reflect rays of light emanating with divergent angles from a single source point S1 in front of structured optical surface 305 to a single destination point D1 also positioned in front of structured optical surface 305. A conventional flat mirror surface is incapable of point-to-point reflections of divergent light emanating from a single source point (e.g., see FIG. 1B). In contrast structured optical surface 305 is able to collect divergent light rays from a single source point S1 and reflect them back to a single destination point D1 via appropriate selection of tilt angles within the array of mirror structures. By selecting the locations of S1 and D1, ray tracing techniques can be used to determine the different oblique angles of each tilt element 220 within structured optical surface 305.

FIG. 3B is a simplified diagram of a structured optical surface 310 having an array of mirror structures configured to provide point-to-multipoint reflections of divergent light rays divided along multiple contiguous regions, in accordance with an embodiment of the invention. Structured optical surface 310 represents another possible configuration of structured optical surface 200.

In the point-to-multipoint embodiment of FIG. 3B, structured optical surface 310 is functionally divided into two contiguous regions A and B. Each contiguous region may include many individual mirror structures. Divergent light emanating from source point S1 incident upon the mirror structures residing within region A are all reflected to destination point D1. Correspondingly, divergent light emanating from source point S1 incident upon the mirror structures residing within region B are all reflected to destination point D2. Although FIG. 3B illustrates only two regions, it should be appreciated that more than two regions may be configured onto structured optical surface 310. By selecting the locations of S1, D1, and D2, ray tracing techniques can be used to determine the different oblique angles of each tilt element 220 within structured optical surface 310.

FIG. 3C is a simplified diagram of a structured optical surface 315 having an array of mirror structures configured to provide point-to-multipoint reflections of divergent light rays divided along multiple interleaved regions, in accordance with an embodiment of the invention. Structured optical surface 315 represents another possible configuration of structured optical surface 200.

In the point-to-multipoint embodiment of FIG. 3C, structured optical surface 315 is functionally divided into a repeating pattern of interleaved regions A and B. Each region may include one or more mirror structures. Divergent light emanating from source point S1 incident upon the mirror structures residing within any of the regions A are all reflected to destination point D2, despite the fact that different instances of region A are non-contiguous regions. Correspondingly, divergent light emanating from source point S1 incident upon the mirror structures residing within any of the regions B are all reflected to destination point D1, also despite the fact that different instances of region B are non-contiguous regions. Although FIG. 3B illustrates only two interleaved regions, it should be appreciated that more than two regions may be configured onto structured optical surface 315. By selecting the locations of S1, D1, and D2, ray tracing techniques can be used to determine the different oblique angles of each tilt element 220 within structured optical surface 315.

Figure 3D:
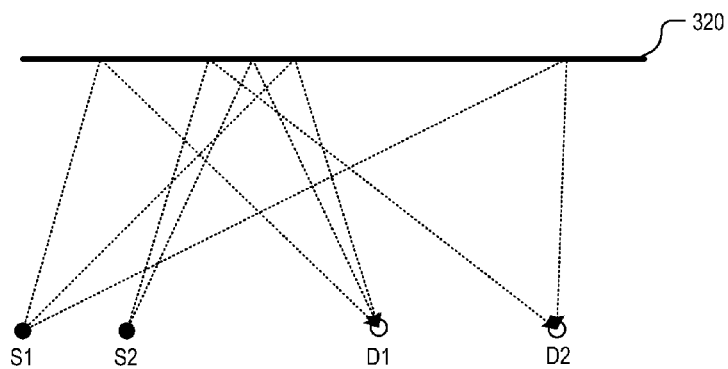
FIG. 3D is a simplified diagram of a structured optical surface having an array of mirror structures configured to provide multipoint-to-multipoint reflections, in accordance with an embodiment of the invention.

FIG. 3D is a simplified diagram of a structured optical surface 320 having an array of mirror structures configured to provide multipoint-to-multipoint reflections, in accordance with an embodiment of the invention. Structured optical surface 320 represents another possible configuration of structured optical surface 200. The mirror structures of structured optical surface 320 can be configured to improve resolution in some locations by directing more light rays to selected areas that would otherwise have limited or lower resolution. This multipoint-to-multipoint configuration may also be used to improve the field of view and eyebox size.

Figure 4A:
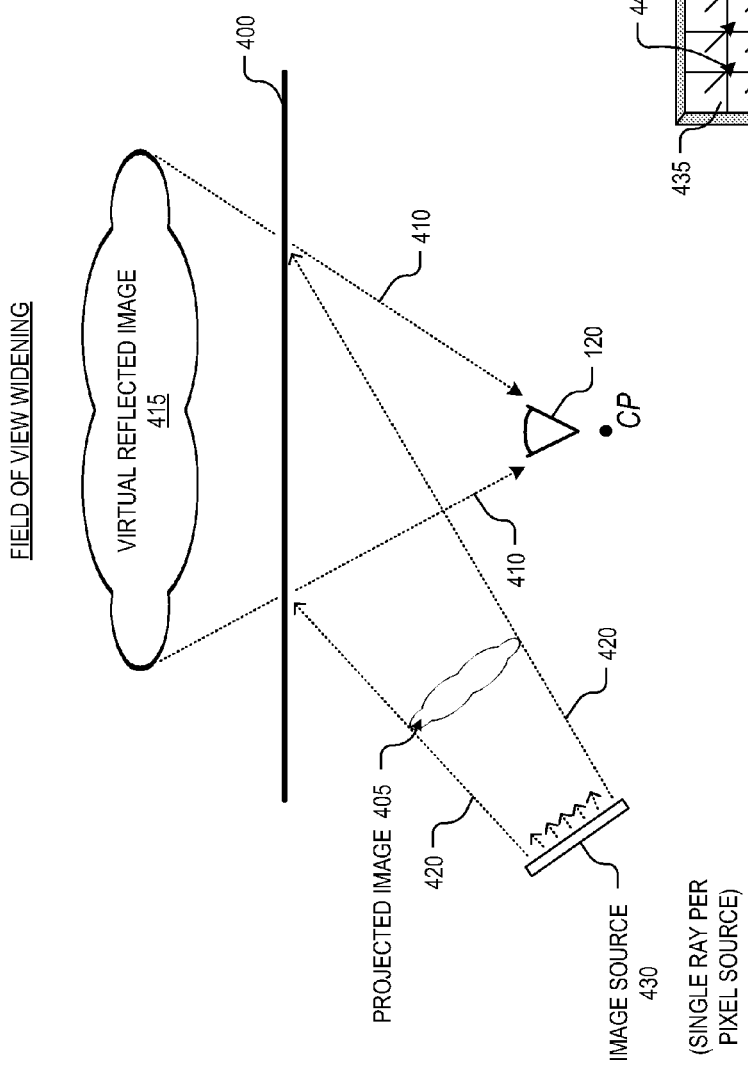
FIG. 4A is a simplified diagram of a structured optical surface having an array of mirrors configured to provide a widened angle of view of a reflected image, in accordance with an embodiment of the invention.

FIG. 4A is a simplified diagram of a structured optical surface 400 having an array of mirror structures configured to provide a widened angle of view of a reflected image, in accordance with an embodiment of the invention. Structured optical surface 400 represents another possible implementation of structured optical surface 200.

Figure 4B:
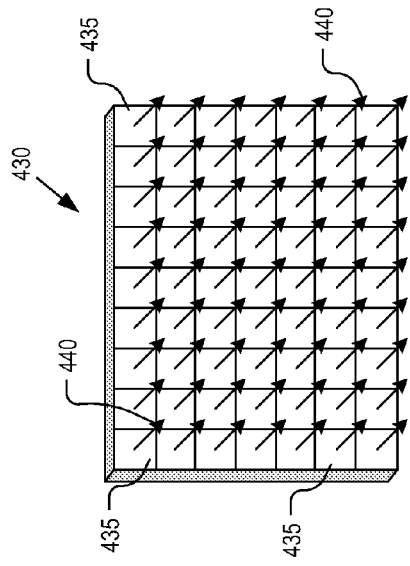
FIG. 4B illustrates an image source that emits substantially a single light ray per pixel of the image source for illuminating a structured optical surface, in accordance with an embodiment of the invention.

Structured optical surface 400 increases the perceived size of a projected image 405 when viewed from eye 120. The increase in perceived size is obtained by increasing the magnitude (e.g., absolute value of magnitude) of the convergence angles of reflected light 410 associated with virtual reflected image 415 relative to the magnitude of the divergence angles of original light rays 420 associated with projected image 405. By increasing the magnitude of the convergence angles, the field of view of eye 120 is correspondingly increased. To achieve this field of view enlargement without destroying projected image 405, image source 430 is a single ray per pixel source. With reference to FIG. 4B, each pixel 435 of image source 430 generates corresponding light having substantially only a single ray 440 (i.e., narrow, low divergence beam). However, the trajectory of each ray 440 can diverge relative to the trajectory of other rays 440 emitted from adjacent pixels 435. It should be made clear that structured optical surface 400 purposefully manipulates the angle of convergence of reflected light 410 by changing the trajectories of the individual rays 440, not necessarily by modifying the divergence of each beam of light represented by individual rays 440. Thus, the magnitude of convergence of the overall reflected image is increased relative to the magnitude of divergence of the overall original incident image.

By selecting the locations of image source 430 and eye 120 relative to structured optical surface 400, ray tracing techniques can be used to determine the different oblique angles of each tilt element 220 within structured optical surface 400 to achieve the desired degree of field of view widening. In one embodiment, there is a one-to-one correspondence between pixels 435 emitting a ray 440 and mirror structures 210 on structured optical surface 400. In this embodiment, the angle of each tilt element 220 is configured to reflect a single ray 440 back to eye 120 at a specified departure angle. In other words, each mirror structure 210 is configured to reflect the light associated with a single pixel. In other embodiments, multiple adjacent pixels within image source 430 may be assigned to be reflected by a single mirror structure 210 to increase image resolution without requiring a similar increase in the number of mirror structures on structured optical surface 400.

There are options on where to place the convergence point CP of reflected light 410, which result in tradeoffs between field of view and size of the eye box. Convergence point CP can be positioned coincident with eye 120, resulting in a large field of view but a small eye box. Alternatively, the convergence point CP can be placed either directly in front or behind eye 120 (e.g., offset by approximately 5 mm), resulting in a larger eye box at the expense of the field of view. These tradeoffs can be tailored according to the needs of a given application.

Figure 5:
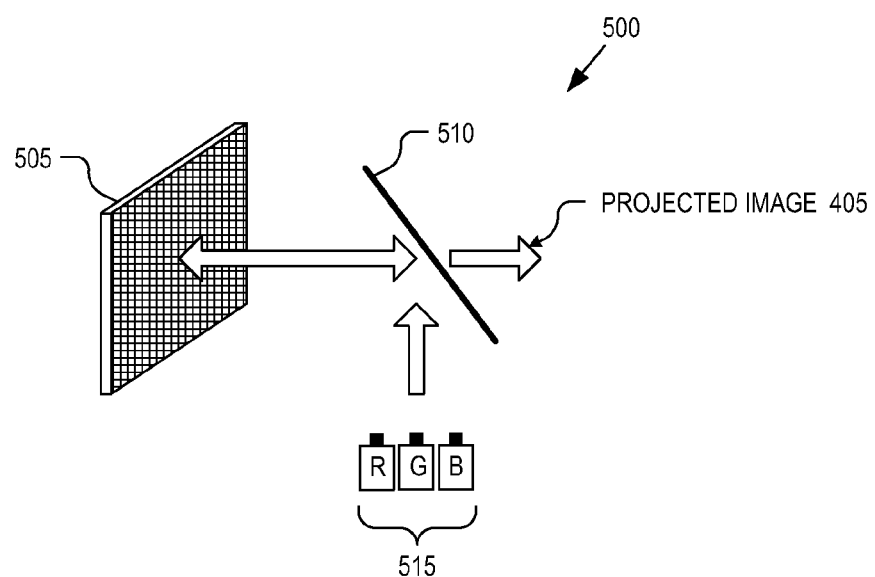
FIG. 5 illustrates an image source that emits substantially a single light ray per pixel of the image source for illuminating a structured optical surface, in accordance with an embodiment of the invention.

FIG. 5 illustrates an example image source 500 for illuminating structured optical surface 400, in accordance with an embodiment of the invention. Image source 500 is one possible implementation of image source 430. The illustrated embodiment of image source 500 includes a liquid crystal on silicon ("LCoS") panel 505, a polarizing beam splitter 510, and an RGB illuminator 515. In one embodiment, illuminator 515 is an RGB laser source that generates light having low divergence. In another embodiment, illuminator 515 is an RGB light emitting diode ("LED") source with a pin hole placed after polarizing beam splitter 510 in the path of projected image 405 to generate output light having low divergence per pixel (e.g., each pixel corresponds to substantially a single ray trajectory of output light). In effect, the pin hole permits substantially only a single ray trajectory from each pixel to pass while blocking the remainder of the light. The latter embodiment of illuminator 515, while inexpensive, is also relatively inefficient. Other image sources that generate substantially a single ray trajectory per pixel (e.g., low divergent light per pixel) may be used.

Figure 6:
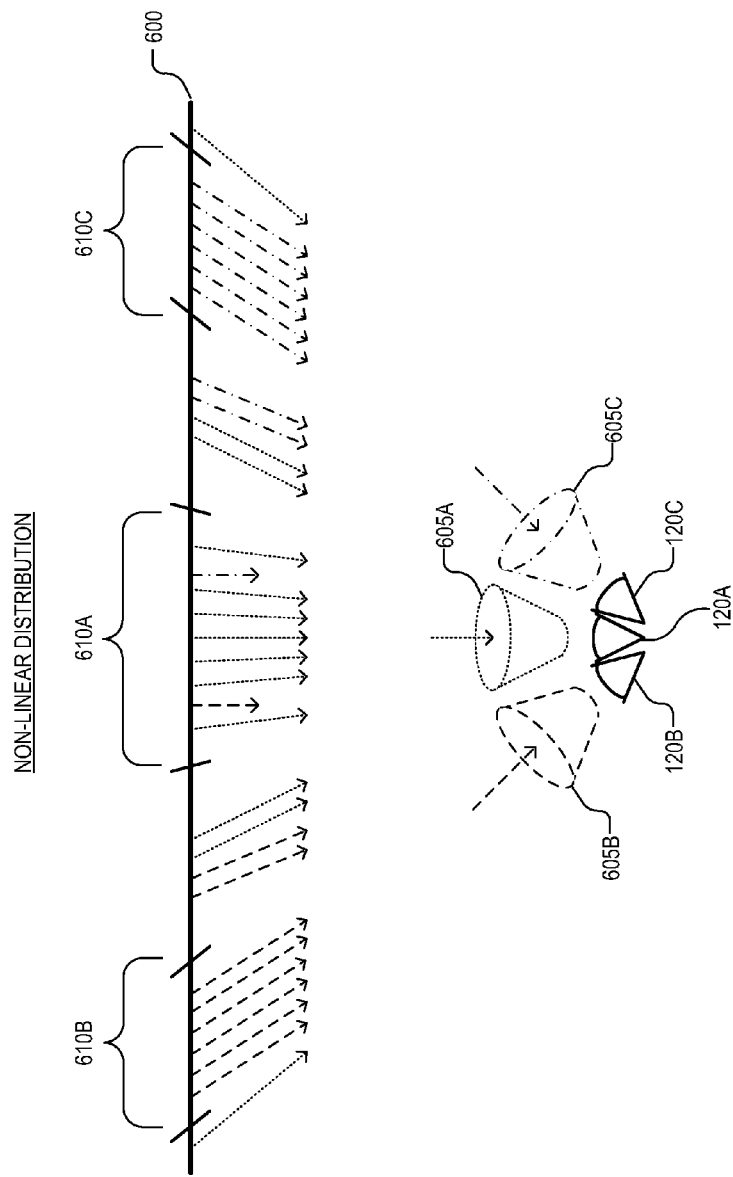
FIG. 6 is a simplified diagram of a structured optical surface having a non-linear distribution of mirror angles, in accordance with an embodiment of the invention.

FIG. 6 is a simplified diagram of a structured optical surface 600 having a non-linear distribution of mirror angles, in accordance with an embodiment of the invention. Structured optical surface 600 represents another possible implementation of structured optical surface 200.

The tilt angles of mirror structures 210 of structured optical surface 600 are configured such that when looking at a given solid or conical angle (e.g., one of solid angles 605A, 605B, or 605C), more light rays are reflected towards the eye 120 within the solid angle than are reflected towards the eye 120 from outside the solid angle. For example, when eye 120 has orientation 120A it is looking directly at region 610A through solid angle 605A. When in orientation 120A, structured optical surface 600 is configured such that of the light rays reflected to eye 120, a higher density occur within solid angle 605A originating from region 610A than occur outside solid angle 605A and originating from outside region 610A. This distribution of mirror structures has the effect of improving image acuity within the field of view of eye 120 where eye acuity is highest. Similarly, when eye 120 is in orientation 120B, structured optical surface 600 is configured such that of the light rays reflected to eye 120, a higher density occur within solid angle 605B originating from region 610B than occur outside solid angle 605B and originating from outside region 610B. Structured optical surface 600 is similarly configured for orientation 120C, solid angle 605C, and region 610C. By selecting the location of eye orientations 120A, B, C, ray tracing techniques can be used to determine the different oblique angles of each tilt element 220 within structured optical surface 600 to achieve the desired non-linear distribution.

Figure 7:
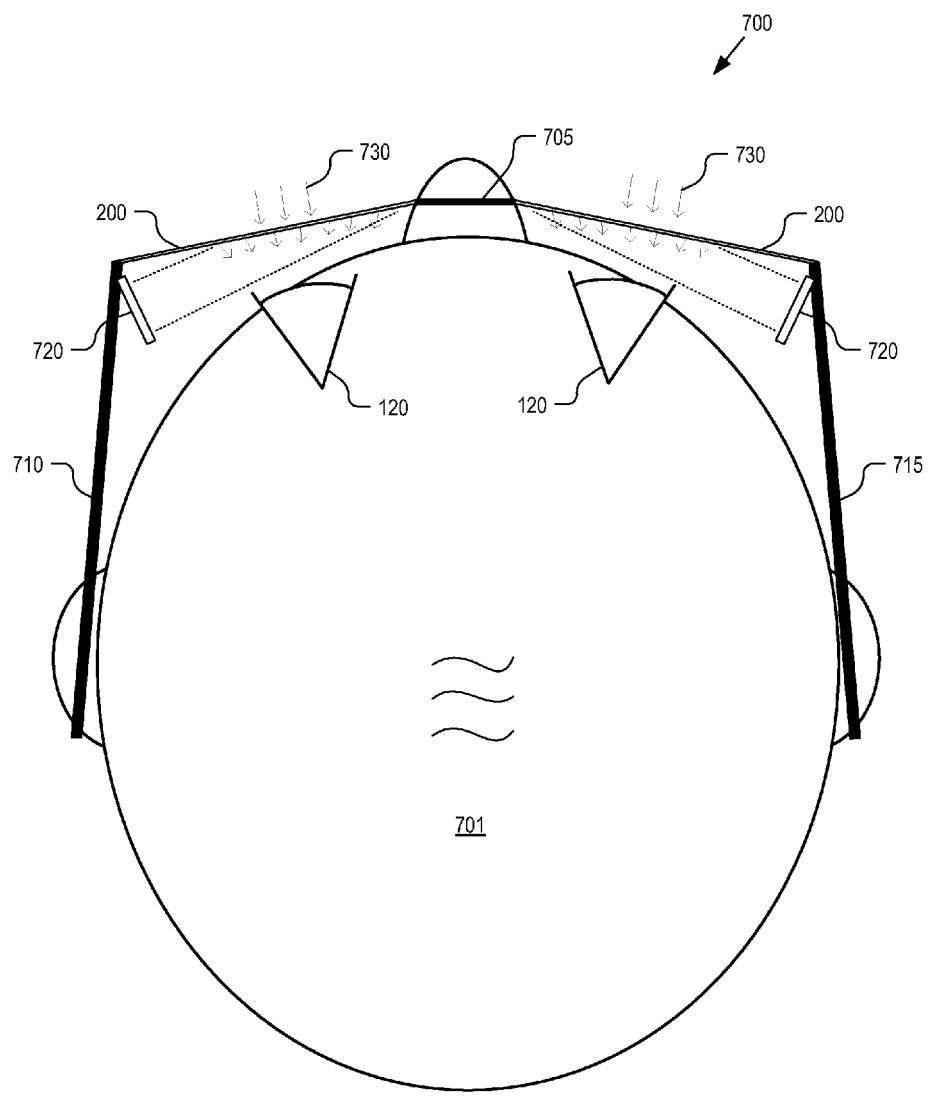
FIG. 7 is a plan view of a near-to-eye optical system including two structured optical surfaces and corresponding image sources, in accordance with an embodiment of the invention.

FIG. 7 is a plan view of a demonstrative near-to-eye display 700 including structured optical surfaces, in accordance with an embodiment of the invention. The illustrated embodiment of near-to-eye display 700 includes two structured optical surfaces 200, a frame assembly including a nose assembly 705, left ear assembly 710, and right ear assembly 715, and image sources 720.

The two structured optical surfaces 200 are secured into an eye glass arrangement that can be worn on a head 701 of a user. The left and right ear assemblies 710 and 715 rest over the user's ears while nose assembly 705 rests over the user's nose. The frame assembly is shaped and sized to position each structured optical surface 200 in front of a corresponding eye 120 of the user. Of course, other frame assemblies may be used (e.g., single, contiguous visor for both eyes).

The illustrated embodiment is capable of displaying an augmented reality to the user. As such, each structured optical surface 200 may be partially transparent and permits the user to see a real world image via external light 730. Left and right (binocular embodiment) CGI may be generated by an image processor, such as a mobile phone, mobile computing device, embedded processor, or otherwise (not illustrated), coupled to drive the image sources 720. In one embodiment, image sources 720 are implemented using image sources 430 illustrated in FIGS. 4A and 4B. Left and right CGIs are then projected by image sources 720 onto structured optical surfaces 200, which reflect the respective CGIs back to eye 120. Although the human eye is typically incapable of bring objects within a few centimeters into focus, since the output light is virtually displayed offset from the eye it is readily in focus. For example, the virtual image may be offset by 15 centimeters, one to two meters, or even at infinity or something lesser thereof. The CGIs are seen by the user as virtual images superimposed over the real world as an augmented reality.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical structure, comprising:
a substrate having a surface; and
an array of mirror structures disposed on the substrate, wherein reflective surfaces of the mirror structures are oriented at a plurality of different oblique angles relative to the surface of the substrate,
wherein the substrate comprises a clear substrate to pass external light through interstitial gaps between the mirror structures such that the optical structure is partially transparent and partially reflective,
wherein at least a portion of the mirror structures have their reflective surfaces obliquely angled relative to the surface of the substrate in two axes of rotation,
wherein the different oblique angles of the mirror structures have fixed positions that are configured to reflect rays of light emanating with a plurality of divergent angles from a single source point positioned in front of the optical structure to a single destination point also positioned in front of the optical structure.

2. The optical structure of claim 1, wherein the surface of the substrate comprises a flat planar surface and wherein each of the mirror structures comprises an individual raised structure that rises from the surface of the substrate and angles a corresponding one of the reflective surfaces relative to the surface of the substrate.

3. The optical structure of claim 1, wherein the surface of the substrate comprises a flat planar surface and wherein each of the mirror structures comprises an individual recessed structure that recesses into the surface of the substrate and angles a corresponding one of the reflective surfaces relative to the surface of the substrate.

4. The optical structure of claim 1, wherein the array of mirror structures are disposed on the substrate over the surface in a grid pattern.

5. The optical structure of claim 4, wherein the reflective surfaces of the mirror structures comprise flat non-transmissive reflective surfaces.

6. The optical structure of claim 5, wherein the reflective surfaces comprise metal.

7. The optical structure of claim 4, wherein the reflective surfaces comprise multiple dielectric reflective layers.

8. An optical structure, comprising:
a substrate having a surface; and
an array of mirror structures disposed on the substrate, wherein reflective surfaces of the mirror structures are oriented at a plurality of different oblique angles relative to the surface of the substrate,
wherein the substrate comprises a clear substrate to pass external light through interstitial gaps between the mirror structures such that the optical structure is partially transparent and partially reflective,
wherein at least a portion of the mirror structures have their reflective surfaces obliquely angled relative to the surface of the substrate in two axes of rotation, wherein the different oblique angles of the mirror structures are fixed angles configured to reflect rays of light emanating with a plurality of divergent angles from a single source point positioned in front of the optical structure to a plurality of destination points, wherein the plurality of destination points is fewer than a number of the diverging rays of light.

9. The optical structure of claim 8, wherein the mirror structures are organized into a first contiguous region of mirror structures and a second contiguous region of mirror structures adjacent to the first contiguous region, wherein the mirror structures of the first contiguous region are angled to reflect the rays of light incident on the first contiguous region to a first destination point and the mirror structures of the second contiguous region are angled to reflect the rays of light incident on the second contiguous region to a second destination point different than the first destination point.

10. The optical structure of claim 8, wherein the mirror structures are organized into interleaved first and second regions of one or more mirror structures, wherein the mirror structures of the first regions are angled to reflect the rays of light incident on the first regions to a first destination point and the mirror structures of the second regions are angled to reflect the rays of light incident on the second regions to a second destination point different than the first destination point.

11. An optical structure, comprising:
a substrate having a surface; and
an array of mirror structures disposed on the substrate, wherein reflective surfaces of the mirror structures are oriented at a plurality of different oblique angles relative to the surface of the substrate,
wherein the substrate comprises a clear substrate to pass external light through interstitial gaps between the mirror structures such that the optical structure is partially transparent and partially reflective,
wherein at least a portion of the mirror structures have their reflective surfaces obliquely angled relative to the surface of the substrate in two axes of rotation,
wherein the different oblique angles of the mirror structures are fixed angles and configured with a non-linear distribution across the array to reflect light back to a destination point with a first density of independent rays falling within a conical angle extending out from the destination point that is higher than a second density of the independent rays falling outside the conical angle.

12. An optical system, comprising:
a structured optical surface including:
a substrate having a surface; and
an array of mirror structures disposed on the substrate, wherein reflective surfaces of the mirror structures are oriented at a plurality of different oblique angles relative to the surface of the substrate, wherein at least a portion of the mirror structures have their reflective surfaces obliquely angled relative to the surface of the substrate in two axes of rotation; and
an image source positioned to project an image onto the structured optical surface for reflection off of the structured optical surface,
wherein the different oblique angles of the mirror structures have fixed angles and are configured to reflect an image projected from a first position in front of the structured optical surface such that light rays of the reflected image have increased convergence or divergence angles relative to each other when perceived from a second position in front of the structured optical surface thereby providing a wider angle of view at the second position.

13. The optical system of claim 12, wherein the image source comprises a pixel array, wherein each pixel of the pixel array emits light substantially having only a single ray trajectory.

14. The optical system of claim 13, wherein the optical system comprises a near-to-eye display and wherein the image is virtually projected onto the structured optical surface at infinity.

15. The optical system of claim 14, further comprising:
a frame assembly to which the structured optical surface and image source are mounted, wherein the frame assembly is for wearing on a head of a user.

16. The optical system of claim 13, wherein there is a one-to-one correspondence between the pixels of the pixel array and the mirror structures of the array of mirror structures.

17. The optical system of claim 12, wherein the substrate comprises a clear substrate to pass external light through interstitial gaps between the mirror structures such that the structured optical surface is partially transparent and partially reflective, wherein the image comprises an computer generated image for augmenting a real world view delivered by the external light.

18. The optical system of claim 12, wherein the reflective surfaces of the mirror structures comprise flat non-transmissive reflective surfaces.

* * * * *

UNITED STATES PATENT AND TRADEMARK OFFICE
CERTIFICATE OF CORRECTION

PATENT NO. : 8,503,087 B1  
APPLICATION NO. : 12/917754  
DATED : August 6, 2013  
INVENTOR(S) : Babak Amirparviz Page 1 of 1

It is certified that error appears in the above-identified patent and that said Letters Patent is hereby corrected as shown below:

On Page 2 of the Title Page, under U.S. Patent Documents, (47th Reference) delete "Amitari" and replace with --Amitai--.

In the Claims

In Column 10, line 28, (claim 14, line 4) delete "at infinity".

Signed and Sealed this  
First Day of October, 2013

Teresa Stanek Rea  
*Deputy Director of the United States Patent and Trademark Office*